Figure 1:
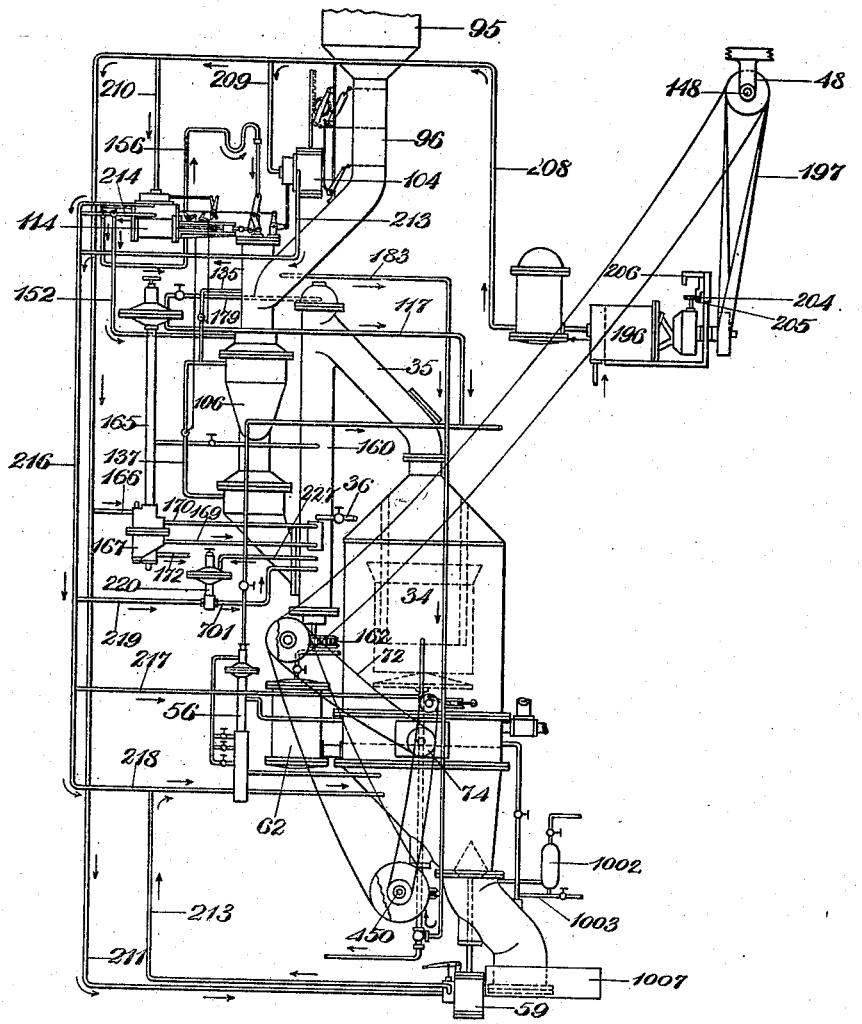

No. 893,192. PATENTED JULY 14, 1908.
E. P. NOYES & S. A. REEVE.
HIGH PRESSURE GAS PRODUCER.
APPLICATION FILED JULY 26, 1905.

5 SHEETS—SHEET 1.

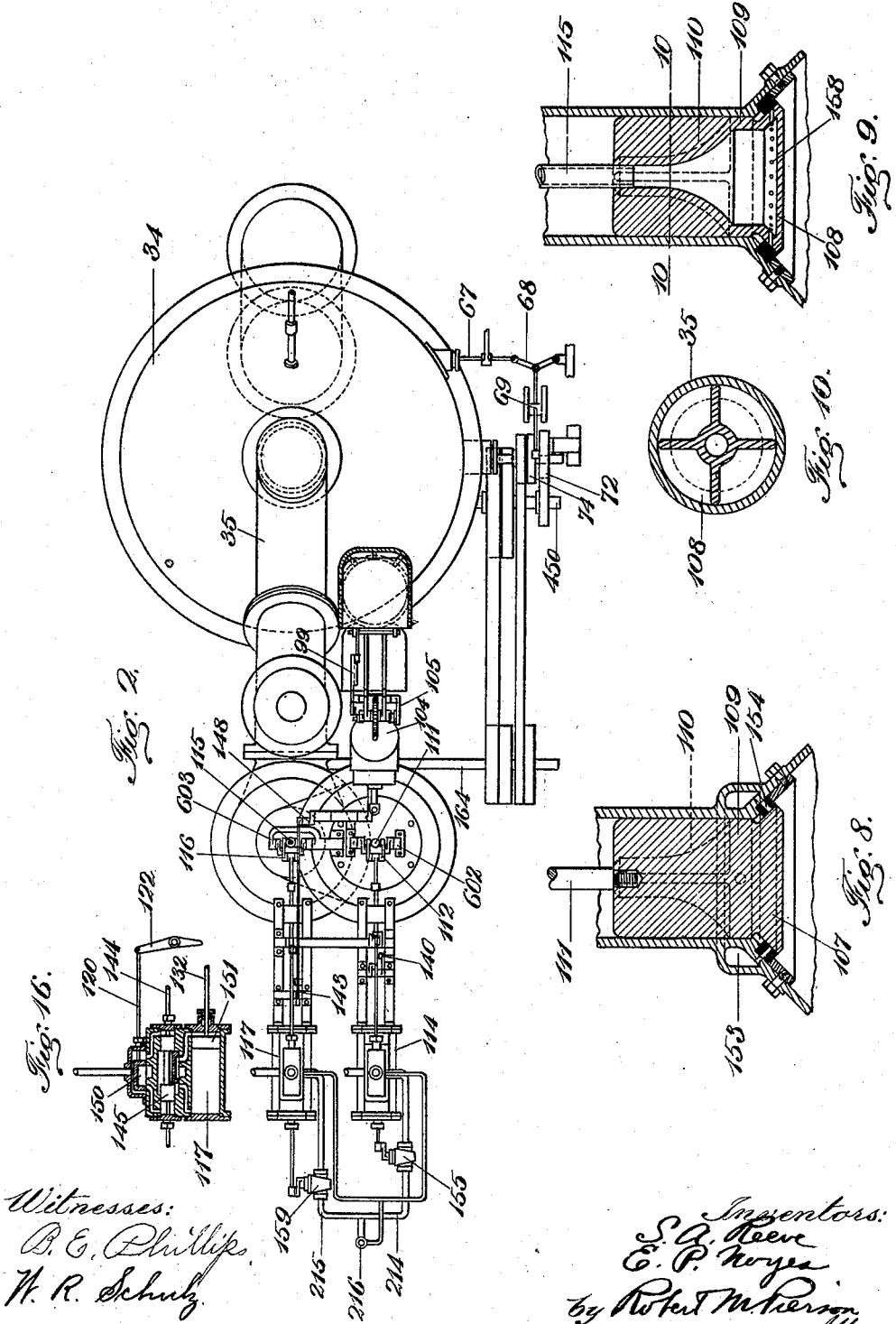

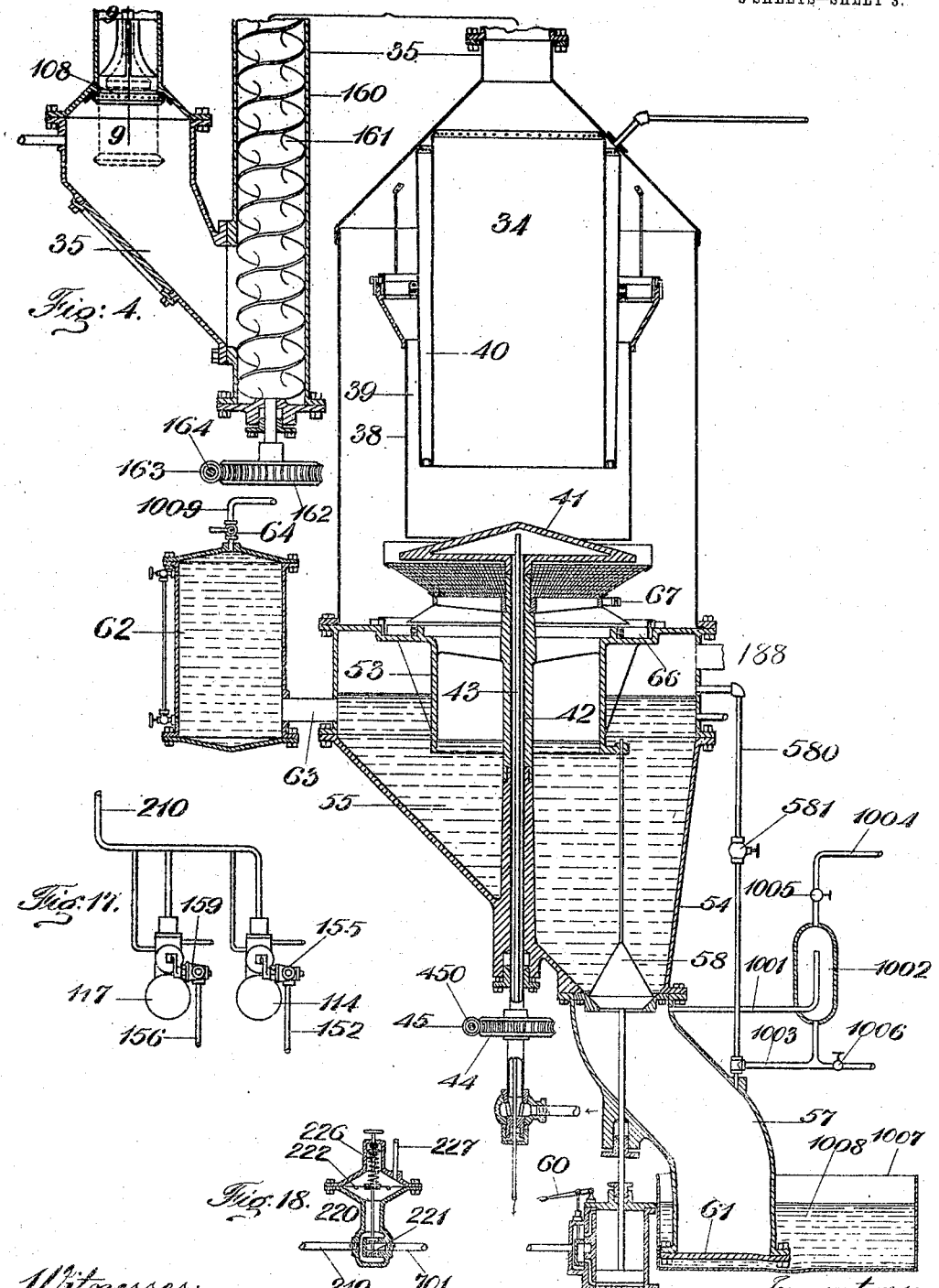

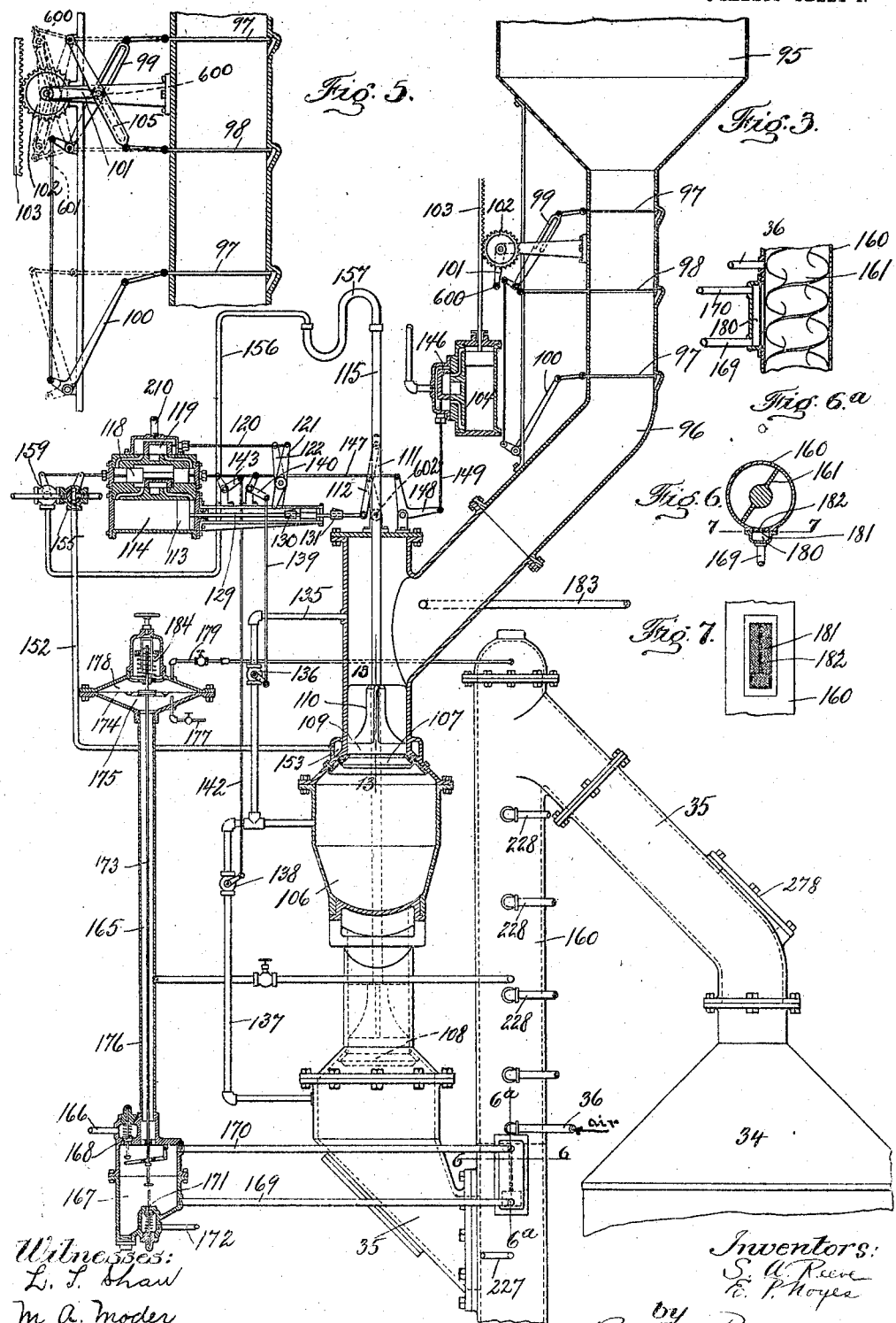

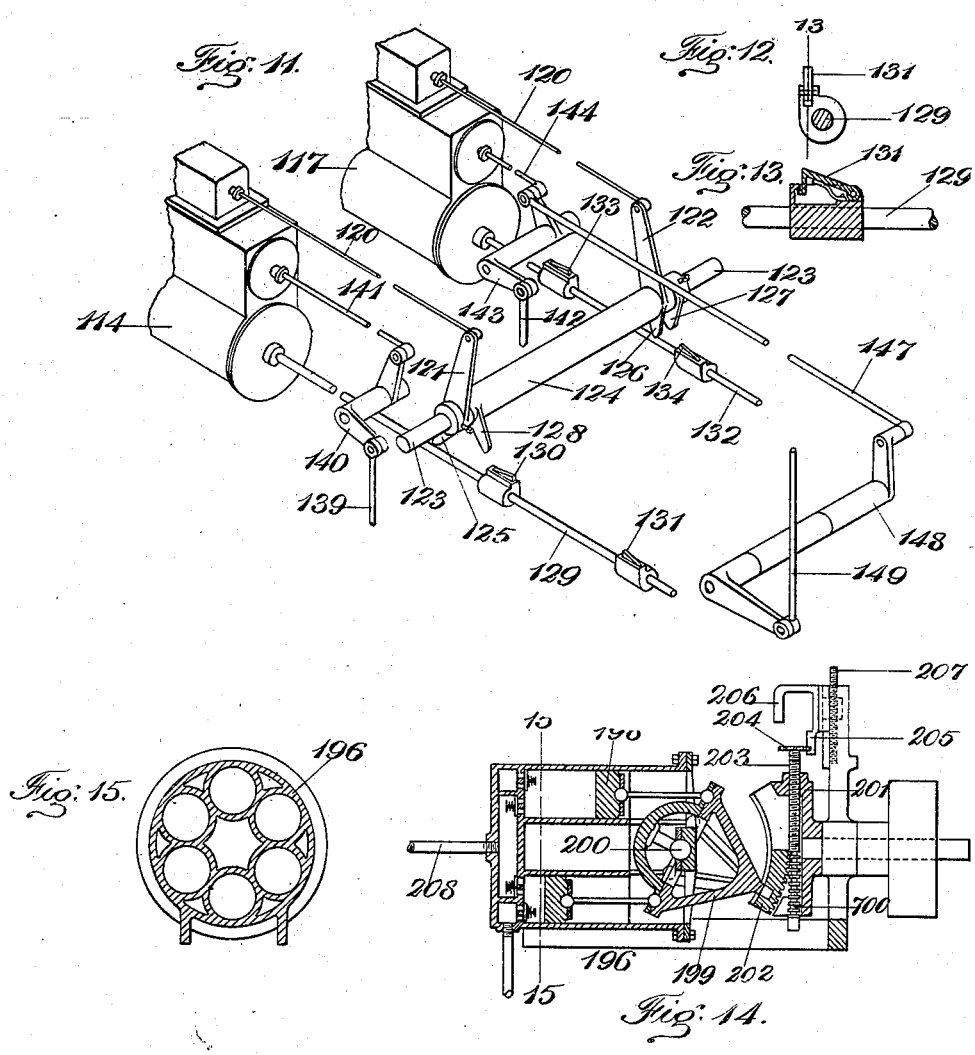

UNITED STATES PATENT OFFICE.

EDWARD P. NOYES, OF WINCHESTER, AND SIDNEY A. REEVE, OF WORCESTER, MASSACHUSETTS, ASSIGNORS TO CHARLES F. BROWN, TRUSTEE, OF READING, MASSACHUSETTS.

HIGH-PRESSURE GAS-PRODUCER.

No. 893,192.        Specification of Letters Patent.        Patented July 14, 1908.

Application filed July 26, 1905. Serial No. 271,268.

*To all whom it may concern:*

Be it known that we, EDWARD P. NOYES, a citizen of the United States, residing at Winchester, county of Middlesex, State of Massachusetts, and SIDNEY A. REEVE, a citizen of the United States, residing at Worcester, county of Worcester, and State of Massachusetts, have invented certain new and useful Improvements in High-Pressure Gas-Producers, of which the following specification and accompanying drawings illustrate one form of the invention, which we now regard as the best out of the various forms in which it may be embodied.
Our invention relates to gas-generators for making gas under pressure by passing compressed air through a bed of burning coal and its main features apply principally to fuel-gas generators known as "producers", using a deep bed of fuel, though also applicable to internal-combustion engine systems in which a coal-furnace with a thin fuel-bed is sealed and operated under pressure. The air-pressure which we prefer to use is something higher than a mere fan blast or light pump-pressure such as is used to supply the draft in producers commonly known as "pressure producers" (to distinguish them from "suction producers") for supplying fuel gas to ordinary gas-engines. We propose to place our producer in a compressed-air line between the combustion-cylinder or other burner of a multi-cylinder engine system, and an air-compressor forming an integral part of said system, and this accordingly requires that the generating chamber of the producer be sealed against the escape in any considerable quantity, of its gaseous contents at times of fuel-feeding and ash-removal. Certain improved feeding, sealing and ash-removing devices for accomplishing this result form the subject of our present application.

The accompanying drawings show a constructive embodiment selected for illustrating the manner of carrying out the invention.

Figure 1 represents a diagrammatic view of the whole apparatus. Fig. 2 represents a top-plan view of the producer. Fig. 3 represents an elevation of the fuel-feeding and adjacent devices partly in section, and omitting certain parts more fully shown in Fig. 5. Fig 4. represents an enlarged vertical section of the producer and adjacent parts. Fig. 5 represents an enlarged section of the devices for actuating the coal-metering valves. Figs. 6 and 6ª represent sections on the correspondingly-numbered lines of Fig. 3. Fig. 7 represents a section on line 7—7 of Fig. 6. Figs. 8 and 9 represent vertical sections of the upper and lower valves constituting a part of the fuel-lock by which pressure in the generator is conserved at times of fuel-feed thereto. Fig. 10 represents a section on line 10—10 of Fig. 9. Fig. 11 represents an isometric view of certain hydraulic cylinders and connected mechanisms included in the fuel-feeding devices. Figs. 12 and 13 are detail end and sectional views of trip-latches included in said devices. Fig. 14 is a sectional view of the pump for furnishing the water-circulation. Fig. 15 is a section on line 15—15 of Fig. 14. Fig. 16 (Sheet 2) is a vertical section of one of the hydraulic cylinders of the fuel-feeding devices. Fig. 17 (Sheet 4) represents an end view of the hydraulic cylinders and connections. Fig. 18 is a vertical section showing a balance-controlled valve for introducing an excess of discharge from the hydraulic cylinders into the water-seal in the fuel-conduit.

We will first enumerate the principal elements shown in the drawings and describe their operation in a general way. The producer shown is of the down-draft type. Both ends are water-sealed so that no appreciable amount of pressure-gas can escape during periods of fuel-introduction and ash-removal, and through the upper seal fuel is introduced in predetermined quantities. This may if desired be done automatically to suit the rate of gas-consumption. In combination with the seal, novel arrangements are provided constituting a pressure lock. The feeding is effected by the use of hydraulic devices for operating the valves, etc. of the automatic stoking mechanism, and these devices include an arrangement whereby the pump which furnishes the power for said devices can have its output varied to regulate the rate of fuel-supply. Novel provisions are made for flushing the valves in the fuel-feeding line to enable them to close tight. The air enters the producer through the column of green and wet fuel emerging from the water-seal at the feeding end. On issuing from the producer-chamber the gas passes through the lower water-seal and is thereby cleansed of some of its impurities. For maintaining the water in the different seals and bodies of water at constant levels, automatic level-controllers are employed.

Referring now in detail to the drawings, 34 is a down-draft gas-producer having at its upper end an inlet for solid fuel supplied through a fuel-conduit 35, and at the same end receiving compressed air through a pipe 36, said air entering an ascending leg of the column of green fuel. A suitable amount of steam may accompany the air as is common in producers of the Dowson type. In this producer the generating chamber 38 is shown double-walled, with an annular space 39 for the formation of a traveling ash-envelop to surround the lower end of the fuel-column at its hottest part and prevent scaffolding and the lodgment of clinkers. An inner section of the chamber wall is made with a water-jacket 40 terminating at a point above the lower end of the chamber, and by this combination of water-jacket and traveling lining formed of the ash or earthy remains of the fuel we avoid the use of a fire-brick lining. There is also an oscillating annular ash-sifter 66 with shaking means including rod 67 (Fig. 2) toggle 68, slide 69 and crank-pin 70 on wheel 71, the latter driven by a belt 72 from wheel 74 on a countershaft 164. The ash-lining features however, are incompletely shown and not included in our present application.

The fuel-column is supported on a slowly-revolving flat-conical hearth-plate 41, made hollow for a water-jacket and fed through concentric axial pipes 42, 43, entrance being by way of the outer pipe 42 and exit by inner pipe 43. The hearth is revolved by gearing 44, 45, the latter on a power-shaft 450. The gas outlet from the generating chamber is between hearth 41 and the lower end of the chamber-wall, and is continued through a tubular member 53 entering an ash-pit 54. These details may be varied, and mechanical knowledge is also sufficient, without special description by us, to vary the direction of air and gas flow so as to make an up-draft producer.

In the ash-pit is a body of water 55 occupying the gas outlet and serving as a washer or cleanser of the gas, condensing its impurities and precipitating its soot and dust, and also quenching the ashes. The water-seal is preferably fed through, and maintained at a predetermined level by, an automatic level-controller 56. At the convergent bottom of the ash-pit we provide in connection with the seal a pressure lock including an ash-discharge pipe 57, admission-valve 58 thereto at the upper end operated by hydraulic cylinder 59 with its valve hand-controlled by lever 60, and discharge-gate 61 at the lower end.

To discharge the ashes the upper valve is opened to fill the lock-chamber in pipe 57, then closed and the lower discharge-gate 61 opened. Pressures are equalized above and below the valve at the time of opening of said valve by a by-pass 580 connecting the ash-pit 54 with the lock-chamber 57 and containing a stop-valve 581. At times of ash-removal the body of water seals the pressure lock against the escape of gas in any considerable quantity, each discharge being a lock-full of water and ashes with only dissolved gas.

From the top of the chamber 57 (Fig. 4) opens a pipe 1001 leading into a separator chamber 1002. The bottom of the separator is connected with lock-chamber 57 by a pipe 1003 which enters 57 at a point lower than pipe 1001. From the top of chamber 1002 opens pipe 1004 through the cock 1005 which may lead to any suitable point in the system supplied by the producer. The opening of cock 1005 is preferably made quite small. From the pipe 1003 a branch opens to the atmosphere through the cock 1006. When a charge of ashes and water has been drawn from the ash-pit 55 into lock-chamber 57 and the valve 58 closed, cock 1006 is opened slightly, letting enough water go to waste to slightly lower the pressure in 57 and to leave a small space above the water in it. Cock 1006 is then closed and cock 1005 opened. This further lowers the pressure in 57 so that any gas which may have become dissolved in the water is caused to separate from the water and to pass through conduit 1004 to a suitable point of use.

1007 is a tank open to the atmosphere and containing a body of water 1008 which seals the discharge gate 61 of chamber 57 and serves as a catch-basin for the rush of ashes and water when 61 is opened. A flushing and replenishing action insuring maintenance of the water-seal during the ash-discharge is effected by a body of water in an auxiliary reservoir 62 having a discharge-and-vent branch-connection 63 with the ash-pit, controlled by the water therein. An upper vent 64 when opened allows reservoir 62 to fill from the water-seal. The gas collecting above the water in reservoir 62 may be led off through a pipe 1009 and used in the system. 188 is an off-take pipe for conducting the gas to the point of use.

Fuel-feeding arrangements are as follows: 95 is a fuel-hopper discharging to the first or atmospheric-pressure section 96 of the fuel conduit 35. In this section are metering devices for feeding predetermined quantities of fuel at predetermined periods to the fuel lock. These devices consist as here shown of a pair of concurrently-operating upper and lower valves 97 and an alternately-operating middle valve 98. The valves 97 are actuated by two connected bell-cranks 99, 100 from a crank 101 oscillated by pinion 102 and rack 103 from the piston of a hydraulic cylinder 104.

The crank 101 (Fig. 5) has, at its outer end, two crank pins 600, one projecting toward 99 and the other toward 105, the crank 101 operating in the plane midway between 99 and 105. The upper lever 99 has on its face toward 101 a U groove into which one of the crank-pins 600 enters on the upper half of its journey. The lever 105 has a similar U groove on its face toward crank 101, into the end of which the other crank-pin 600 enters upon the lower half of its journey. The upper half of the journey of the crank opens the valves 97 and the lower half of the journey opens valve 98. On the upper half of the down-stroke of said crank the valves 97 are closed, and the opening and closing movement is begun and completed before any movement of the middle valve 98 takes place. The opening of upper valve 97 while the middle valve 98 is closed admits fuel from the hopper 95 to said valve 98. The closing of upper valve 97 shuts off the hopper, leaving a predetermined quantity of fuel below said valve, and the opening of valve 98 while valves 97 are closed, drops this fuel onto the lower valve 97. The subsequent opening of lower valve 97 drops this fuel onto the upper fuel-lock valve 107.

The pressure-lock for the fuel includes a chamber 106 forming part of the outer or remote leg of the fuel-conduit 35 and having a sloping portion to permit off-set of the valves, both of which are operated from above. 107 is the upper or entrance valve to this lock-chamber and 108 is the lower or exit valve. Each valve has a piston-portion 109 above the seating portion to prevent fuel from crushing between valve and seat and hindering the seating movement, and a bell-shaped hub 110 to deflect the falling fuel from forceful contact with the seating portion of the valve. The upper valve 107 is operated by stem 111, and toggle 112 from the cross-head of a piston 113 contained in a hydraulic cylinder 114, which is shown in section in Fig. 3. The lower valve 108 is operated by stem 115, and a similar toggle 116 from the piston 151 of a second hydraulic cylinder 117, shown in section in Fig. 16. The slide-valves of the cylinders 114, 117 are operated by piston-motors 118, 145 controlled by slide-valves 119, 150, whose rods 120 are connected to rock-levers 121, 122, the former fast to a rock-shaft 123 and the latter to a rock-sleeve 124 surrounding said shaft (Fig. 11). Each lever has a toe 125, 126 and the rock-shaft and rock-sleeve have additional toes or lugs 127, 128. The piston-rod 129 of cylinder 114 has off-set spring-latches 130, 131, the former actuating the toe 128 on the out-stroke of rod 12 and the latter actuating the toe 125 on the in-stroke of said rod. The piston rods 132 of cylinder 117 has similar off-set latches 133, 134, the former actuating toe 127 on the out-stroke of the piston-rod 132 and the latter the toe 126 on the in-stroke of said rod.

135 is a by-pass connecting the atmospheric conduit-section 96 with the lock-section 106 and passing around the upper lock-valve 107, said by-pass containing a stop-valve 136 which upon being opened, equalizes the pressures above and below said lock-valve and permits the free opening thereof. A similar by-pass 137, containing stop-valve 138, connects the lock-chamber 106 above the lower lock-valve 108 with the pressure-section of the fuel-conduit below said valve. Of these stop-valves, the upper one 136 is operated through rod 139 and rocker 140 from the rod 141 of the piston-motor 118 pertaining to cylinder 114. The lower stop-valve 138 is operated by a rod 142 and rocker 143 from the rod 144 of the piston-motor 145 pertaining to cylinder 117. The last-said piston-motor 145 also operates the valve 146 (Fig. 3) of the hydraulic cylinder 104 for operating the meter-valves, through rod 147, bell-crank 148 and rod 149.

From the above it will be seen that a movement of either of the two pilot or rider valves 119 (Fig. 3) or 150 (Fig. 16) to the left will admit water and cause a movement of the corresponding piston-motor 118 or 145, and therethrough of piston 113 or 151, to the left. It will be apparent that these two actions cannot take place at the same time. These movements cause alternate openings of the by-pass valves 136, 138, produced by the piston-motors and slightly preceding the alternate openings of the lock-valves 107 and 108 respectively. This left-hand movement of piston 145 raises valve 146 and therethrough raises the rack 103 with consequent closing of meter-valves 97, 97 and opening of meter-valve 98. The left-hand movement of pistons 113 and 151 effects the opening of the lock-valves 107, 108 through bending of the toggles 112, 116, reacting upon the fixed journals 602, 603. The left-hand movement of either pilot-valve is caused by the piston-rod of the other's piston, through the inner latch 130 or 133, while the right-hand movement of said pilot-valve, causing movements of the parts controlled thereby opposite to the movements above-enumerated, is produced by its own piston-rod through the outer latch 131 or 134.

The sequence of the foregoing hydraulic devices is as follows:

For the upper lock-valve 107, (1) Pilot-valve 119 moves to the left because latch 133 encounters toe 127 as the lower lock-valve is closing.

(2) Piston-motor 118 moves to the left and opens by-pass valve 136.

(3) Piston 113 moves to the left, causing the upper lock-valve to open and admit a charge of fuel to the lock-chamber 106. As the piston finishes its outward movement latch 131 encounters toe 125 and (4) Pilot-valve 119 moves to the right.

(5) Piston-motor 118 moves to the right and closes by-pass valve 136.

(6) Piston 113 moves to the right and closes the upper lock-valve.

The foregoing movements are begun and completed during the time that the lower lock-valve is closed, except as the closing movement of said lower valve actuates the pilot-valve 119 as before mentioned.

For the lower lock-valve 108, (1) Pilot-valve 150 moves to the left because latch 130 encounters toe 128 as the upper lock-valve closes.

(2) Piston-motor 145 moves to the left and (a) opens by-pass valve 138, (b) raises valve 146.

(3) Piston 151 moves to the left, causing the lower lock-valve to open and discharge the contents of the lock-chamber into the pressure-section of the fuel-conduit. Rack 103 rises, closing meter-valves 97, 97 and opening meter-valve 98. As the piston 151 completes its outward movement, latch 134 encounters toe 126 and (4) Pilot-valve 150 moves to the right.

(5) Piston-motor 145 moves to the right and (a) closes by-pass valve 138, (b) depresses valve 146.

(6) Piston 151 moves to the right and closes the lower lock-valve. Rack 103 descends, closing meter-valve 98 and opening meter-valves 97, 97, the lower of the two latter releasing a charge of fuel onto the closed upper lock-valve 107.

Provisions are made for flushing the walls of the two lock-valve apertures by jets of water delivered as either valve approaches its seat. For the upper lock-valve 107 a pipe 152 leads to a corridor 153 from which jet-outlets 154 penetrate the seat of said fuel-valve. This pipe is controlled by a plug-valve 155 actuated by piston-motor 118, and as said piston-motor moves to the right the plug-valve opens and flushes the lock-valve 107 as the latter approaches its seat. For the lower lock-valve 108 a pipe 156 containing a flexible section 157 connects with the hollow stem 115 and conducts water to the interior of said valve 108, from which jet-outlets 158 penetrate the seating face of the valve. A plug-valve 159 controls the pipe 156 and is actuated by piston-motor 145 so as to open and flush the seat of the lower lock-valve as said piston-motor moves to the right and the lock-valve approaches its seat. This flushing of the seating surfaces cleans said surfaces and permits each lock-valve to close tight.

In the vertical leg 160 of the pressure-section of the fuel-conduit is a screw conveyer 161 for elevating the charges of fuel discharged through the pressure-lock and delivering them to the generating chamber of the producer. This screw is rotated by worm-gear 162, worm 163 and counter-shaft 164.

The conveyer-section 160 of the fuel-conduit, and the remote section thereof containing the pressure-lock, together form substantially a U in which is maintained a water-seal whose primary function is to prevent the outward passage through the lock of pressure-gas or air from the producer. We may of course employ other liquids than water for the seal, for example a combustible liquid such as oil.

The water-seal is replenished through an automatic level-controller 165 (shown in detail in Fig. 3) and the maximum level of its inner leg determined thereby. The water is supplied through a pipe 166 entering the lower chamber 167 of the controller casing under control of an admission-valve 168, and said chamber has open connection with the fuel-conduit section 160 through two pipes 169, 170 at different levels.

171 is a valve controlling discharge through a waste-pipe 172. The valves 168, 171 are actuated by opposite movements of a rod 173 attached to a diaphragm 174 whose lower-side chamber 175 is subject to being cut off from pressure-connection with the producer by the water reaching and covering the lower end of tube 176 or covering pipe 170. When this occurs, the pressure below the diaphragm becomes reduced by release through a leakage-pipe 177 controlled by a small valve. A constant pressure is maintained in the upper diaphragm-chamber 178 through a pipe 179 connecting said chamber with the pressure-section of the fuel-conduit 35 and hence with the interior of the producer. The pipes 169, 170 enter a vestibule 180 to the water-seal section (see Figs. 6 and 7) separated therefrom by a screen 181 and connecting through a slot 182 having a wide lower part and a narrow upper part. Water is maintained in the outer leg of the water-seal up to the level of an overflow-pipe 183 which conducts the waste to the water-jacket of the revolving hearth 41.

So long as the pipe 170 is uncovered, the pressures above and below diaphragm 174 are equalized and a spring 184 raises rod 173, holding open the admission-valve 168 and causing water to feed to the water-seal. The narrow part of the slot 182 acts as a gas-throttle for the pressure passing to diaphragm-chamber 175. When the water reaches such a height with respect to the pipe 170 that the release from chamber 175 through pipe 177 balances the inflow of gas, the pressure above the diaphragm depresses the latter, and the feed is stopped by the closing of admission-valve 168. Should the level continue to rise through accretion from other sources, the diaphragm will continue to descend and open the release-valve 171, whereby a free path for exit is provided through the lower large portion of the orifice 182 and the pipe 169. It may here be mentioned that the other water-level device 56 herein shown is or may be one operating in general in a manner similar to the controller 165.

All of the water required in the system is supplied by a pump 196 driven by a belt 197 from the countershaft 148. Said pump (Fig. 14) has a multiplicity of pistons 198 driven from a wabbling cross-head or lever 199 pivoted at 200 and driven in a conical path by a crank-plate 201. On the latter is a segmental guide on a radius from the pivot 200, containing a wrist-block 202 having on its back teeth engaging a cylindrical rack 700 ending in a screw 203 with a star-wheel 204 at its outer end. The screw 203 threads into the crank-plate 201.

205, 206 are two abutments on the same support adjustable radially upon the frame of the machine by a screw 207. These abutments are adapted to engage the teeth of the star-wheel on opposite sides and they have a free gap between them in which the star-wheel is not actuated. The star-wheel always works toward this gap and according to the position thereof is determined the throw of the cross-head 199 and hence the stroke of the pistons 198 and the delivery of the pump 196. As the latter supplies motive power for the actuation of the lock-valves 107, 108 and meter-valves 97, 98, it will be seen that an adjustment of the screw 207 determines the rate of fuel-feed and influences the rate of gas-production and the quality of the gas.

The water-circuit is by a trunk-pipe 208 from the pump 196 and thence primarily to the meter-cylinder 104 through branch 209, to the pilot-valves and piston-motors of the lock-valve cylinders 114 and 117 through branch 210, to the fuel-conduit water-seal through branch 166, and to the ash-valve cylinder 59 through branch 211. Secondarily the waste from cylinders 104, 114, 117 and 59 passes by branches 213, 214, and 215 to a secondary trunk-pipe 216, from which it is taken to supply the producer-jacket 40 through branch 217, and the ash-pit seal through branch 218. From the ash-pit no water-release takes place except through the ash-lock. Evaporation disposes of the excess. Should the waste going to pipe 216 be greater than that abstracted therefrom through the branches 217, 218, the excess goes to the water-seal in the fuel-conduit through a branch 219 controlled by a valve-device 220. This device contains a balanced valve 221 (Fig. 18) actuated by a diaphragm 222 receiving on its lower side the pressure of conduit 216 via branch 219 and on its upper side the pressure of a spring 226 and that of the producer received through pipe 227. Should the pressure in the conduit 216 rise excessively through constriction of its outlets, the valve 221 will admit excess water to the water-seal through pipe 701. From the water-seal it can find release through the level-controller release-pipe 172 if the normal level of the seal should thereby be exceeded.

Compressed air, preferably heated and accompanied by steam, passes into the fuel-column through the air-pipe 36, and through the fuel into the gas-generating chamber of the producer. The fuel which has just emerged from the water-seal is wet and will more or less condense any steam contained in the air-supply, the water of condensation falling back into said seal with the water which drains from the fuel. Such water as passes on with the fuel into the producer becomes vaporized and aids in supplying the producer with the necessary steam, but much of the water drains off and returns to the seal before the fuel accomplishes its descent into the producer. The entering air and steam may aid in drying the fuel and pre-heating it so as to facilitate the oxidizing and other reactions in the producer and conserve the heat.

While this invention is believed to apply principally to closed combustion furnaces such as gas-producers, as mentioned in the introduction, wherein solid fuel is burned with compressed air, we also recognize its applicability in a broad sense to the feeding of solids to other closed vessels maintained under a gaseous pressure.

We claim:—

1. In a gas-producer or other closed vessel, the combination of a closed chamber, a conduit for the passage of solid material between the interior and exterior of said chamber, said conduit having a mechanical pressure-lock, and means providing a liquid seal in said lock.

2. In a gas-producer or other closed vessel, the combination of a closed chamber, a charging conduit for supplying solid material thereto, said conduit including a pressure-lock, and means for maintaining a liquid-seal in said lock.

3. An apparatus for making gas under high pressure comprising a pressure gas-producer, means for supplying compressed air thereto, and a fuel-feeding conduit therefor including a liquid-seal.

4. An apparatus for making gas under high pressure comprising a high-pressure gas-producer, a fuel-conduit therefor, a liquid-seal in said conduit, and means for automatically preserving the liquid in said seal at a predetermined level.

5. In a gas-producer or other closed vessel, the combination of a closed chamber, a liquid-seal therefor, means for dropping solid material by gravity into said seal, and mechanism for elevating said material from the seal to introduce it into the upper end of said chamber.

6. In a gas-producer or other closed vessel, the combination of a chamber closed to the atmosphere, a conduit for feeding solid material thereto, means for maintaining a liquid-seal in said conduit, means for automatically feeding solid material into said seal, and separate means for feeding the material out of said seal into the chamber.

7. In a gas-producer or other closed vessel, the combination of a closed chamber, a conduit for feeding solid material thereto, a pressure-lock in said conduit, and means for automatically operating said lock at predetermined intervals.

8. Apparatus for making gas under high pressure comprising a combustion-chamber closed to the atmosphere, a fuel-conduit therefor including a pressure-lock, and means for automatically and intermittently feeding predetermined separate charges of solid fuel through said lock into the pressure-space of the producer.

9. In a gas-producer or other closed vessel, the combination of a closed chamber, a conduit for feeding solid material thereto, a pressure-lock in said conduit having entrance and exit valves, and means for automatically operating said valves alternately at predetermined intervals.

10. In a gas-producer or other closed vessel, the combination of a closed chamber, a U-conduit for supplying solid material thereto, a pressure-lock in the remote leg of said conduit, and means for maintaining a liquid seal in said lock.

11. In a gas-producer or other closed vessel, the combination of a closed chamber, a U-conduit for supplying solid material thereto, a liquid-seal in said conduit, a pressure-lock in the remote leg of said conduit, and means for automatically maintaining a predetermined liquid level in the leg nearer to the chamber.

12. The combination of a closed chamber, a U-shaped conduit for feeding solid material thereto, means for supplying a liquid to said conduit to seal the same, and a liquid overflow-outlet from the remote leg of the U.

13. The combination of a closed chamber, a U-shaped conduit for feeding solid material thereto, means for supplying a liquid to said conduit to seal the same, and means for automatically maintaining a predetermined level of the liquid in both legs of the U.

14. In a gas-producer or other closed vessel, the combination of a pressure chamber, a conduit for feeding solid material thereto having a water-seal bend, alternately-operating lock-valves in said conduit, and means to automatically maintain a predetermined water-level in said bend.

15. The combination of a pressure chamber, a conduit for feeding solid material thereto, a pressure-lock in said conduit, means to automatically operate said lock at predetermined intervals, and means to automatically meter predetermined quantities of material to the lock.

16. Apparatus for making gas under high pressure comprising a high-pressure gas-producer, an automatic fuel-lock therefor, and an automatic fuel-meter anterior to said lock and timed with respect to the latter's operation.

17. The combination of a pressure chamber, a conduit for supplying solid material thereto, a pressure-lock in said conduit, and means between said lock and the chamber, for elevating the material into the chamber.

18. Apparatus for making gas under high pressure comprising a high-pressure gas-producer, a fuel-supply conduit therefor, a liquid-seal in said conduit, and means to elevate the fuel from said seal into the producer.

19. Apparatus for making gas under high pressure comprising a high-pressure gas-producer, a U-shaped fuel-supply conduit therefor, means to maintain a liquid seal in said conduit, a pressure-lock in the remote leg of said conduit, and a fuel-feeder in the nearer leg thereof.

20. In a gas-producer or other closed vessel, the combination of a pressure chamber, a pressure-lock therefor having an automatically-operated valve, and means for automatically equalizing the pressures on opposite sides of said valve prior to the opening thereof.

21. In a gas-producer or other closed vessel, the combination of a pressure chamber, a pressure-lock therefor provided with an automatically-operated valve and a water-seal, a by-pass conduit connecting the spaces on opposite sides of said valve, and an automatic valve in said by-pass timed with the lock-valve.

22. In a gas-producer or other closed vessel, the combination of a pressure chamber having an opening, a pressure-lock associated with said opening, a liquid seal coöperating with said lock, and a device associated with the lock and liquid seal for separating and recovering the gas which accompanies the liquid in the lock.

23. In a gas-producer, the combination of a liquid seal, a chamber in branch connection with said seal for receiving liquid and gas from the seal, and means to separate the gas from the liquid.

24. The combination of a pressure chamber, a conduit for feeding solid material thereto, a valve in said conduit, and means for liquid-flushing said valve.

25. The combination of a gas-producer, a fuel-supply conduit therefor, a pressure-lock in said conduit including a valve, means for operating said valve, and means timed with the movement of said valve for automatically flushing the same with liquid.

26. The combination of a gas-producer, a seating fuel-valve therefor, and means timed with the movements of said valve for automatically liquid-flushing the valve-aperture.

27. The combination of a gas-producer pressure-chamber, a conduit for feeding solid material thereto, a valve for said conduit having a valve-seat, and means for liquid-flushing said valve-seat.

28. The combination of a gas-producer, a seating fuel-valve therefor, means to reciprocate said valve, and means timed to operate as the valve approaches its seat for automatically liquid-flushing the valve-aperture to remove grit from between said valve and its seat.

29. The combination of a gas-producer, a fuel-supply conduit therefor, a pressure-lock in said conduit including alternately-operating entrance and exit-valves, and means to automatically liquid-flush each valve-aperture when its valve is open.

30. The combination of a high-pressure chamber, a conduit therefor having feeding devices at successive points, and means whereby the operation of one of said devices controls that of another.

31. In a gas-producer or other closed vessel, the combination of a pressure chamber, a supply-conduit therefor, a plurality of lock-valves in said conduit, motors for operating said valves, and means whereby the operation of one of said motors controls that of another.

32. In a gas-producer or other closed vessel, the combination of a pressure-lock having alternately-operating valves, hydraulic motors for actuating said valves, and means whereby each of said motors controls the operation of the other.

33. In a gas-producer or other closed vessel, the combination of a pressure chamber, a conduit for feeding solid material thereto, alternately-operating lock-valves in said conduit, hydraulic motors for operating said valves, valves for said motors, and means whereby each motor controls the valve of the other motor.

34. The combination of a high-pressure chamber having a supply conduit, pressure-lock devices in said conduit, hydraulic mechanism for actuating said devices, metering devices for said conduit, hydraulic mechanism for actuating said metering devices, and means whereby the last-said hydraulic mechanism is controlled by the movements of the first-said hydraulic mechanism.

35. In a gas-producer or other closed vessel, the combination of a pressure chamber included in a gas-pressure line, hydraulic devices for feeding solid material to said chamber, and means whereby the waste liquid from said devices is introduced into the pressure line.

36. The combination of a high-pressure gas-producer, hydraulic fuel-supply mechanism therefor, and a water-seal for said producer supplied by the waste from said hydraulic mechanism.

37. The combination of a high-pressure gas-producer, hydraulic fuel-supply mechanism therefor, a water-seal for said producer, and means controlled by the pressure of the waste water from said hydraulic mechanism for automatically introducing said waste water to the water-seal.

38. In a gas-producer, the combination of a closed gas-generating chamber having an ash-discharge conduit, a mechanical pressure-lock in said conduit, and means for providing a body of water in said conduit to seal the lock against the escape of gas during ash-discharge.

39. Apparatus for making gas under high pressure comprising a down-draft gas-producer, an ash-pit in the path of the producer-gas having a discharge-outlet, means to maintain a water-body in said ash-pit, and a reservoir having a branch vent-and-discharge connection with the ash-pit controlled by the level of the water-body.

40. In a gas-producer, the combination of a down-draft closed gas-generating chamber having at the bottom a gas-outlet and an ash-discharge conduit, a pressure lock in said conduit, and means for maintaining a body of water in the gas outlet to be traversed by the gas and also serving to enter the pressure-lock during ash-discharge.

In witness whereof we have hereunto set our hands before two subscribing witnesses, the first day of June 1905.

EDWARD P. NOYES.
SIDNEY A. REEVE.

Witnesses:
R. M. PIERSON,
L. T. SHAW.